US012640565B2

(12) United States Patent
Wang et al.

(10) Patent No.: US 12,640,565 B2
(45) Date of Patent: May 26, 2026

(54) POWER SUPPLY SYSTEM

(71) Applicant: Huawei Digital Power Technologies Co., Ltd., Shenzhen (CN)

(72) Inventors: Liang Wang, Dongguan (CN); Chuntao Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/758,575

(22) Filed: Jun. 28, 2024

(65) Prior Publication Data

US 2025/0007290 A1      Jan. 2, 2025

(30) Foreign Application Priority Data

Jun. 29, 2023    (CN) .......................... 202310794516.7

(51) Int. Cl.
*H02J 3/32* (2026.01)
*H02J 3/01* (2006.01)
*H02J 7/00* (2006.01)

(52) U.S. Cl.
CPC    *H02J 3/32* (2013.01); *H02J 3/01* (2013.01); *H02J 7/0016* (2013.01); *H02J 7/00712* (2020.01); *H02J 2207/20* (2020.01)

(58) Field of Classification Search
None
See application file for complete search history.

(56) References Cited

U.S. PATENT DOCUMENTS

| | | | | | |
|---|---|---|---|---|---|
| 8,575,896 | B2 * | 11/2013 | Greening | .................. | G06F 1/26 |
| | | | | | 320/140 |
| 10,566,795 | B2 * | 2/2020 | Shibata | ............. | H02J 7/007182 |
| 11,316,471 | B2 * | 4/2022 | Narla | .................... | H02J 7/0013 |
| 11,728,651 | B1 * | 8/2023 | Sheehy | ............... | H02J 7/00712 |
| | | | | | 307/43 |
| 2006/0290205 | A1 * | 12/2006 | Heber | ..................... | H02J 3/007 |
| | | | | | 307/65 |
| 2012/0153726 | A1 * | 6/2012 | Moon | ..................... | H02J 3/381 |
| | | | | | 307/46 |

(Continued)

FOREIGN PATENT DOCUMENTS

| | | |
|---|---|---|
| CN | 110323771 A | 10/2019 |
| CN | 112673543 A | 4/2021 |
| EP | 2600489 A1 | 6/2013 |

*Primary Examiner* — Thomas J. Hiltunen
(74) *Attorney, Agent, or Firm* — Conley Rose, P.C.

(57) ABSTRACT

A power supply system includes a bypass branch, at least two energy storage branches, and a controller. An input of the bypass branch is configured to connect to a power supply, and an output of the bypass branch is configured to supply power to a load. An output of each energy storage branch is configured to connect the load to the output of the bypass branch. Each energy storage branch includes an energy storage unit and a bidirectional inverter unit, and the bidirectional inverter unit is configured to, when the energy storage branch operates in a charging mode, convert an alternating current provided by the bypass branch into a direct current and output the direct current to the energy storage unit. The bidirectional inverter unit is also config-ured to, when the energy storage branch operates in a discharging mode, convert a direct current provided by the energy storage unit into an alternating current.

20 Claims, 4 Drawing Sheets

(56) References Cited

U.S. PATENT DOCUMENTS

| 2012/0176094 A1* | 7/2012 | Okuda | ............... | H01M 10/482 |
| | | | | 320/134 |
| 2022/0224144 A1* | 7/2022 | Emert | .................. | H02J 7/0063 |

* cited by examiner

Control at least one of at least two energy storage branches to operate in a charging mode, and control a remaining energy storage branch to operate in a discharging mode — S101

When an output voltage of a bypass branch is lower than a preset voltage value, switch the energy storage branch operating in the charging mode to the discharging mode — S102

POWER SUPPLY SYSTEM

CROSS-REFERENCE TO RELATED APPLICATIONS

This claims priority to Chinese Patent Application No. 202310794516.7 filed on Jun. 29, 2023, which is hereby incorporated by reference in its entirety.

TECHNICAL FIELD

This disclosure relates to the field of power electronics technologies, and in particular, to a power supply system.

BACKGROUND

With development of energy storage technologies, energy storage becomes key support for constructing new data centers. With implementation of a national zero-carbon policy, increasing a peak-valley price difference and adding a long-term energy storage system in a large data center to implement peak load shaving and therefore increase economic benefits of the system becomes a trend.

A large-capacity energy storage system is used for the large data center to ensure continuous power supply to a load. However, a special requirement of the data center is to ensure continuous power supply to the load when an electric energy fault occurs. In an existing power supply system, switching time occurs when a charging state is switched to a discharging state when an electric energy fault occurs, and power supply to a load is affected in the switching time. Therefore, how to resolve a problem of a power failure occurring when electric energy is interrupted or faulty becomes a technical problem to be urgently resolved currently.

SUMMARY

In view of the foregoing problem, this disclosure provides a power supply system, to reduce a risk of a load power failure in a case in which electric energy is interrupted or faulty.

This disclosure provides a power supply system. The power supply system includes a bypass branch, at least two energy storage branches, and a controller. An input of the bypass branch is configured to connect to a power supply, and an output of the bypass branch is configured to supply power to a load. An output of each energy storage branch is configured to connect the load to the output of the bypass branch. Each energy storage branch includes an energy storage unit and a bidirectional inverter unit, and the bidirectional inverter unit is configured to, when the energy storage branch operates in a charging mode, convert an alternating current provided by the bypass branch into a direct current and output the direct current to the energy storage unit; and when the energy storage branch operates in a discharging mode, convert a direct current provided by the energy storage unit into an alternating current. The controller is configured to control at least one of the at least two energy storage branches to operate in the charging mode, and control a remaining energy storage branch to operate in the discharging mode. The bidirectional inverter unit is configured to supply power to the load when the energy storage branch operates in the discharging mode and an output voltage of the bypass branch is lower than a preset voltage value.

It may be understood that in this disclosure, a part of energy storage branches operate in the charging mode, and a part of energy storage branches operate in the discharging mode. When electric energy is interrupted or faulty, because the output voltage of the bypass branch is lower than the preset voltage value, the energy storage branch operating in the discharging mode can quickly supply power to the load. This helps reduce a risk of a power failure of the load.

In a possible implementation, the controller is configured to switch, in response to that the output voltage of the bypass branch is lower than the preset voltage value, the energy storage branch operating in the charging mode to the discharging mode.

It may be understood that the energy storage branch operating in the charging mode is controlled to switch to the discharging mode, so that all the energy storage branches can be invoked to supply power to the load, to further reduce a risk of a power failure of the load.

In a possible implementation, in response to that the output voltage of the bypass branch is lower than the preset voltage value, the energy storage branch is configured to run in overload for preset time when operating in the discharging mode, and the preset time is greater than switching time for the energy storage branch to switch from the charging mode to the discharging mode.

It may be understood that the energy storage branch operating in the discharging mode can run in overload, so that the energy storage branch operating in the charging mode has sufficient time for mode switching, and the power supply system can stably supply power to the load within the switching time. This reduces a risk of a power failure of the load.

In a possible implementation, the power supply system further includes at least one transformer unit, one end of each transformer unit is configured to connect to the load, the other end of each transformer unit is configured to connect to one or more bidirectional inverter units in the at least two energy storage branches, and each transformer unit is configured to boost a voltage output by the bidirectional inverter unit and output the voltage to the load, or decrease the voltage output by the bypass branch and output the voltage to the bidirectional inverter unit.

In a possible implementation, each energy storage branch includes one transformer unit, one end of the transformer unit is configured to connect to the load, and the other end of the transformer unit is configured to connect to a bidirectional inverter unit in the energy storage branch in which the transformer unit is located.

In a possible implementation, the controller is configured to control $m$ energy storage branches in the at least two energy storage branches to operate in the charging mode, and control an energy storage branch other than the $m$ energy storage branches to operate in the discharging mode. In response to energy storage units in the $m$ energy storage branches all being charged with first preset power, the controller is configured to control $p$ energy storage branches in the $m$ energy storage branches to operate in the discharging mode, and control $p$ energy storage branches other than the $m$ energy storage branches to operate in the charging mode, until energy storage units in all the energy storage branches are all charged with second preset power, where $m$ is an integer greater than 2, $p$ is an integer greater than or equal to 1, and $m$ is greater than $p$.

It may be understood that in embodiments of this disclosure, the energy storage units are charged in a polling manner, so that the energy storage units in the plurality of energy storage branches can be charged in a time division manner. This helps avoid a case in which a load has a power failure when the bypass branch is faulty because the energy storage unit operating in the discharging mode has insufficient power.

In a possible implementation, the controller is configured to, in response to that an energy storage unit in the energy storage branch operating in the charging mode is fully charged, control the energy storage branch in which the fully charged energy storage unit is located to switch from the charging mode to the discharging mode, and control an energy storage branch in which an energy storage unit that is not fully charged and that operates in the discharging mode is located to switch to the charging mode.

In a possible implementation, the energy storage branch is configured to output a compensation current in the charging mode, and the compensation current is used to compensate for a harmonic current in a load current of the bypass branch.

In a possible implementation, the bypass branch includes a bypass switch, the bypass switch includes a first switching device and a second switching device that are reversely connected in parallel, the controller is configured to output a first drive signal and a second drive signal, the first drive signal is used to drive the first switching device to turn on or off, and the second drive signal is used to drive the second switching device to turn on or off.

In a possible implementation, the bypass branch includes an input cabinet, an output cabinet, and a bypass maintenance cabinet. A first end of the input cabinet is configured to connect to the power supply, and a second end of the input cabinet is configured to connect to the bypass switch. A first end of the output cabinet is configured to connect to the bypass switch, and a second end of the output cabinet is configured to connect to the load. A first end of the bypass maintenance cabinet is configured to connect to the first end of the input cabinet, and a second end of the bypass maintenance cabinet is configured to connect to the second end of the output cabinet.

DESCRIPTION OF EMBODIMENTS

The following describes technical solutions in embodiments of this disclosure with reference to accompanying drawings in embodiments of this disclosure.

It may be understood that a connection relationship described in this disclosure is a direct connection or an indirect connection. For example, that A is connected to B may be that A is directly connected to B, or may be that A is indirectly connected to B by using one or more other electrical components. For example, A may be directly connected to C, and C may be directly connected to B, so that A and B are connected by using C. It may be further understood that "A is connected to B" described in this disclosure may be that A is directly connected to B, or may be that A is indirectly connected to B by using one or more other electrical components.

In descriptions of this disclosure, unless otherwise specified, "/" indicates "or". For example, A/B may indicate A or B. The term "and/or" in this specification describes only an association relationship between associated objects and indicates that three relationships may exist. For example, A and/or B may indicate the following three cases: Only A exists, both A and B exist, and only B exists.

In descriptions of this disclosure, the words such as "first", "second", and the like are merely used to distinguish between different objects, and do not limit a quantity and an execution sequence. In addition, the words such as "first", "second", and the like do not indicate a definite difference. In addition, the terms "including" and "having" and any other variants thereof are intended to cover a non-exclusive inclusion.

The technical solutions of this disclosure are further described below in detail with reference to the accompanying drawings.

Figure 1:
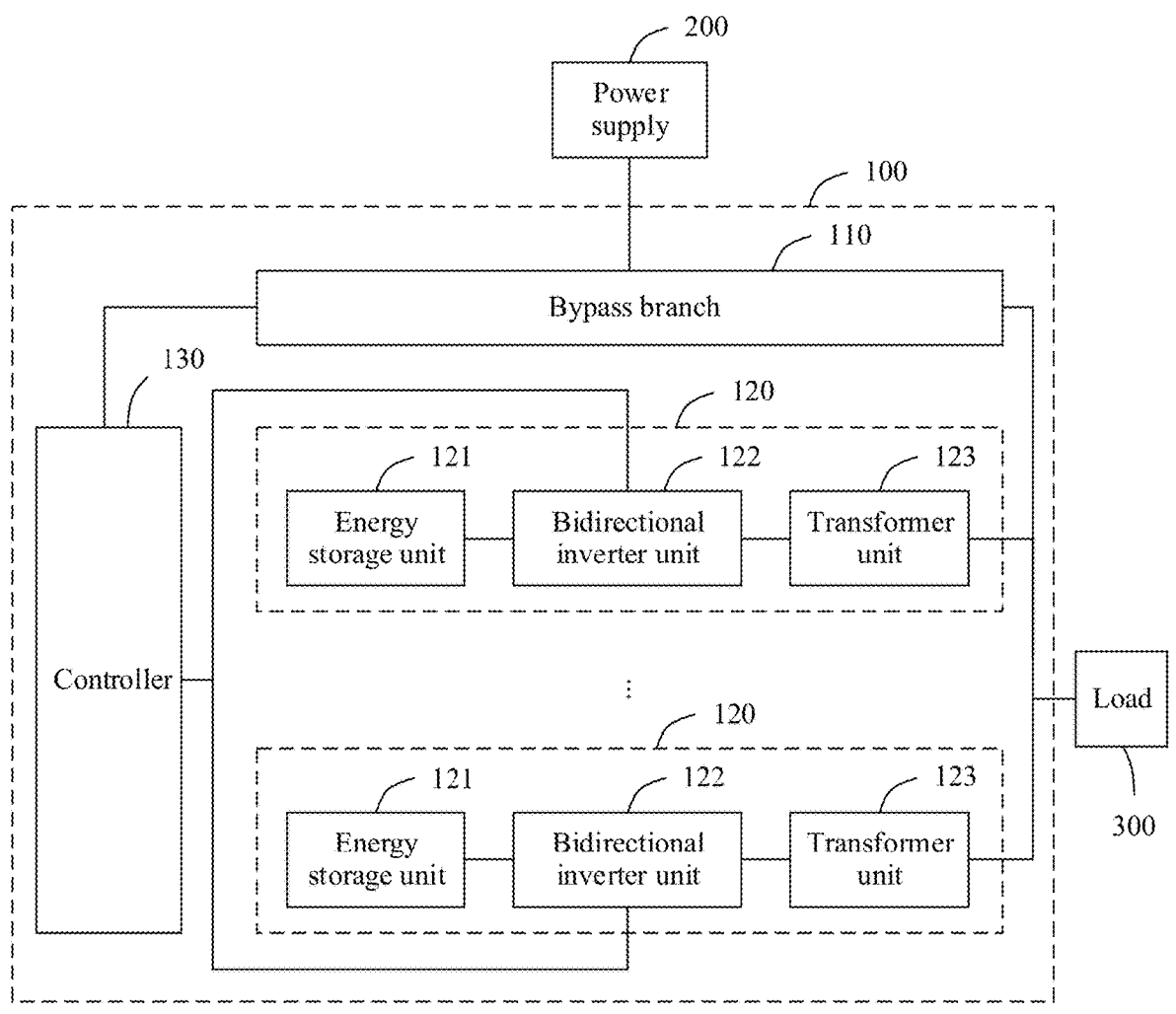
FIG. 1 is a schematic diagram of a connection between a power supply system and a power supply and a load according to an embodiment of this disclosure.

Refer to FIG. 1. An embodiment of this disclosure provides a power supply system 100. The power supply system 100 includes a bypass branch 110, at least two energy storage branches 120, and a controller 130.

An input of the bypass branch 110 is configured to connect to a power supply 200 to obtain electric energy. The power supply 200 may be a power grid or a medium-voltage diesel generator, and the bypass branch 110 can obtain electric energy, for example, 10 kilovolt (kV) electric energy, from the power grid or the medium-voltage diesel generator. An output of the bypass branch 110 is configured to connect to a load 300 to supply power to the load 300. The load 300 may be an industrial power supply device, a household appliance, or the like.

There are at least two energy storage branches 120. Each energy storage branch 120 includes an energy storage unit 121, a bidirectional inverter unit 122, and a transformer unit 123. The energy storage branch 120 can operate in a charging mode or a discharging mode. In the charging mode, the energy storage unit 121 in the energy storage branch 120 can store electric energy. In the discharging mode, the energy storage branch 120 can supply power to the load 300 when an output voltage of the bypass branch 110 is lower than a preset voltage value. It may be understood that the preset voltage value may be 0 or a voltage value slightly greater than 0. This is not limited in this embodiment of this disclosure. When the output voltage of the bypass branch 110 is lower than the preset voltage value, it indicates that the output voltage of the bypass branch 110 drops, for example, the power supply 200 is faulty, or the bypass branch 110 is faulty.

In a possible implementation, the energy storage branch 120 can output a compensation current in the charging mode, and the compensation current is used to compensate for a harmonic current in a load current of the bypass branch 110. It may be understood that the harmonic current in the load current is compensated, so that a bypass-input power factor (PF) can be increased.

The energy storage unit 121 is configured to store electric energy. The energy storage unit 121 is usually a battery. For example, the energy storage unit 121 is a battery cluster including a plurality of batteries.

The bidirectional inverter unit 122 is configured to, when the energy storage branch 120 operates in the charging mode, convert an alternating current provided by the bypass branch 110 into a direct current, and output the direct current to the energy storage unit 121. When the energy storage branch 120 operates in the discharging mode, the bidirectional inverter unit 122 is configured to convert a direct current provided by the energy storage unit 121 into an alternating current. The bidirectional inverter unit 122 is further configured to supply power to the load 300 when the energy storage branch 120 operates in the discharging mode and the output voltage of the bypass branch 110 is lower than the preset voltage value. It may be understood that the bidirectional inverter unit 122 is an alternating current (AC)-direct current (DC) bidirectional inverter.

The transformer unit 123 is configured to perform voltage boosting or voltage decreasing. One end of each transformer unit 123 is configured to connect to the load 300, and the other end of each transformer unit 123 is configured to connect to a bidirectional inverter unit 122 in one or more energy storage branches 120 in the energy storage branches 120. In other words, the transformer unit 123 may be connected to a bidirectional inverter unit 122 of a same energy storage branch 120 in a one-to-one manner (as shown in FIG. 1), or the transformer unit 123 may be connected to a plurality of bidirectional inverter units 122 of different energy storage branches 120 in a one-to-many manner. For example, a cluster-level battery of each energy storage unit 121 is connected to the bidirectional inverter unit 122 in a one-to-one manner. Each transformer unit 123 is configured to boost a voltage output by the bidirectional inverter unit 122 and output the voltage to the load 300, or decrease the voltage output by the bypass branch 110 and output the voltage to the bidirectional inverter unit 122.

In a possible implementation, each energy storage branch 120 includes one transformer unit 123, one end of the transformer unit 123 is configured to connect to the load 300, and the other end of the transformer unit 123 is configured to connect to a bidirectional inverter unit 122 in the energy storage branch 120 in which the transformer unit 123 is located.

It may be understood that in a possible implementation, the transformer unit 123 may not be disposed in the energy storage branch 120, that is, the transformer unit 123 is omitted. In these implementations, when the energy storage branch 120 operates in the charging mode, electric energy output by the bypass branch 110 can be directly output to the energy storage unit 121 after the bidirectional inverter unit 122 performs voltage conversion on the electric energy, to charge the energy storage unit 121. When the energy storage branch 120 operates in the discharging mode, electric energy output by the energy storage unit 121 can be directly output to the load 300 after the bidirectional inverter unit 122 performs voltage conversion on the electric energy, to supply power to the load 300.

The controller 130 is configured to connect to the bypass branch 110 and all the energy storage branches 120. For example, the controller 130 is connected to a bypass switch in the bypass branch 130 and the bidirectional inverter unit 122 in the energy storage branch 120. The controller 130 is configured to control at least one energy storage branch 120 of the at least two energy storage branches 120 to operate in the charging mode, and control a remaining energy storage branch 120 to operate in the discharging mode. In other words, the controller 130 is configured to control one part of energy storage branches 120 to operate in the charging mode, and control the other part of energy storage branches 120 to operate in the discharging mode. A specific quantity of energy storage branches 120 operating in the charging mode or the discharging mode is not limited in this embodiment of this disclosure, but is at least greater than or equal to 1. In other words, at any moment, there is at least one energy storage branch 120 operating in the charging mode, and there is at least one energy storage branch 120 operating in the discharging mode.

It may be understood that the controller 130 of the power supply system 100 provided in this embodiment of this disclosure can control one part of energy storage branches 120 to operate in the charging mode, and control the other part of energy storage branches 120 to operate in the discharging mode. When the electric energy output by the bypass branch 110 is interrupted or faulty, because the output voltage of the bypass branch 120 is lower than the preset voltage value, the energy storage branch 120 operating in the discharging mode can quickly supply power to the load 300. This helps reduce a risk of a power failure of the load 300.

In some embodiments, the controller 130 is further configured to control, when the output voltage of the bypass branch 110 is lower than the preset voltage value, the energy storage branch 120 operating in the charging mode to switch to the discharging mode.

It may be understood that the energy storage branch 120 operating in the charging mode is controlled to switch to the discharging mode, so that all the energy storage branches 120 can be invoked to supply power to the load 300, to further reduce a risk of a power failure of the load 300.

It may be understood that it takes a period of time for the energy storage branch 120 to complete switching from the charging mode to the discharging mode. However, in this period of time, because a part of energy storage branches 120 already operate in the discharging mode, even if the output voltage of the bypass branch 110 drops due to a fault in this period of time, the energy storage branch 110 already operating in the discharging mode can quickly supply power to the load 300. In other words, the energy storage branch 110 operating in the discharging mode serves as hot standby, and can be ready to supply power to the load 300 when the output voltage of the bypass branch 110 drops, to avoid a power failure of the load 300.

In a possible implementation, an operating voltage of the bidirectional inverter unit 122 operating in the discharging mode is lower than the output voltage of the bypass branch 110 when power is normally supplied. When an output voltage drop occurs at the output of the bypass branch 110 due to a fault, for example, the output voltage of the bypass branch 110 is lower than the preset voltage value, a voltage at the bidirectional inverter unit 122 is greater than the voltage at the output of the bypass branch 110, and the bidirectional inverter unit 122 operating in the discharging mode and the energy storage branch 120 in which the bidirectional inverter unit 122 is located can be naturally connected, to transmit electric energy to the load 300 after a voltage is boosted by the transformer unit 123. It may be understood that a process from the output voltage drop at the bypass branch 110 to the electric energy output by the bidirectional inverter unit 122 does not need to be controlled. Therefore, this process takes a short time, and continuous power supply of the power supply system 100 to the load 300 is not affected during such short time.

In some embodiments, in response to the output voltage of the bypass branch 110 being less than the preset voltage value, the energy storage branch 120 is configured to run in overload for preset time when operating in the discharging mode. The preset time is greater than switching time for the energy storage branch 120 to switch from the charging mode to the discharging mode. In other words, the energy storage branch 120 that switches from the charging mode to the discharging mode can complete switching within the preset time. For example, when the output voltage of the bypass branch 110 drops, the bidirectional inverter unit 122 in the remaining energy storage branch 120 operating in the discharging mode can run in overload for the preset time.

It may be understood that the energy storage branch 120 operating in the discharging mode can run in overload, so that the energy storage branch 120 operating in the charging mode has sufficient time for mode switching, and the power supply system 100 can stably supply power to the load within the switching time. This reduces a risk of a power failure of the load.

It may be understood that when all the energy storage branches 120 operate in the discharging mode normally, a sum of electric energy that can be provided by all the energy storage branches 120 is greater than an electric energy requirement of the load 300. However, in consideration of cost saving, a quantity of the energy storage branches 120 is usually set based on a power supply requirement of the load 300, so that when all the energy storage branches 120 operate normally. that is, when all the energy storage branches 120 do not run in overload, a sum of the electric energy that can be provided is close to or slightly greater than the power supply requirement of the load 300. That is, if a part of energy storage branches 120 operate in the charging mode, including an energy storage branch 120 that is being switched from the charging mode to the discharging mode, the energy storage branch 120 operating in the discharging mode runs in overload, to meet a power supply requirement of the load 300.

In some embodiments, each energy storage branch 120 further includes a power distribution unit 124. One end of the power distribution unit 124 is connected to the load 300, and the other end of the power distribution unit 124 is configured to connect to the transformer unit 123. The power distribution unit 124 is configured to output, to the transformer unit 123, the alternating current output by the bypass branch 110, or output, to the load 300, an alternating current output by the transformer unit 123.

In some embodiments, the controller 130 can control the energy storage units 121 in all the energy storage branches 120 to be charged in a polling manner.

Specifically, the controller 130 is configured to control m energy storage branches 120 in the at least two energy storage branches to operate in the charging mode, and control an energy storage branch 120 other than the m energy storage branches to operate in the discharging mode. In response to the energy storage units 121 in the m energy storage branches 120 charged with first preset power, the controller 130 is configured to control p energy storage branches 120 in the m energy storage branches to operate in the discharging mode, and control p energy storage branches 120 other than the m energy storage branches 120 to operate in the charging mode, until energy storage units 121 in all the energy storage branches 120 are all charged with second preset power. A quantity of the at least two energy storage branches is N, N is an integer greater than or equal to 3, m is an integer greater than 2, p is an integer greater than or equal to 1, N is greater than m, and m is greater than p.

It may be understood that when the controller 130 performs the foregoing steps for a plurality of times, the energy storage units 121 in all the energy storage branches 120 can complete polling charging.

Figure 2:
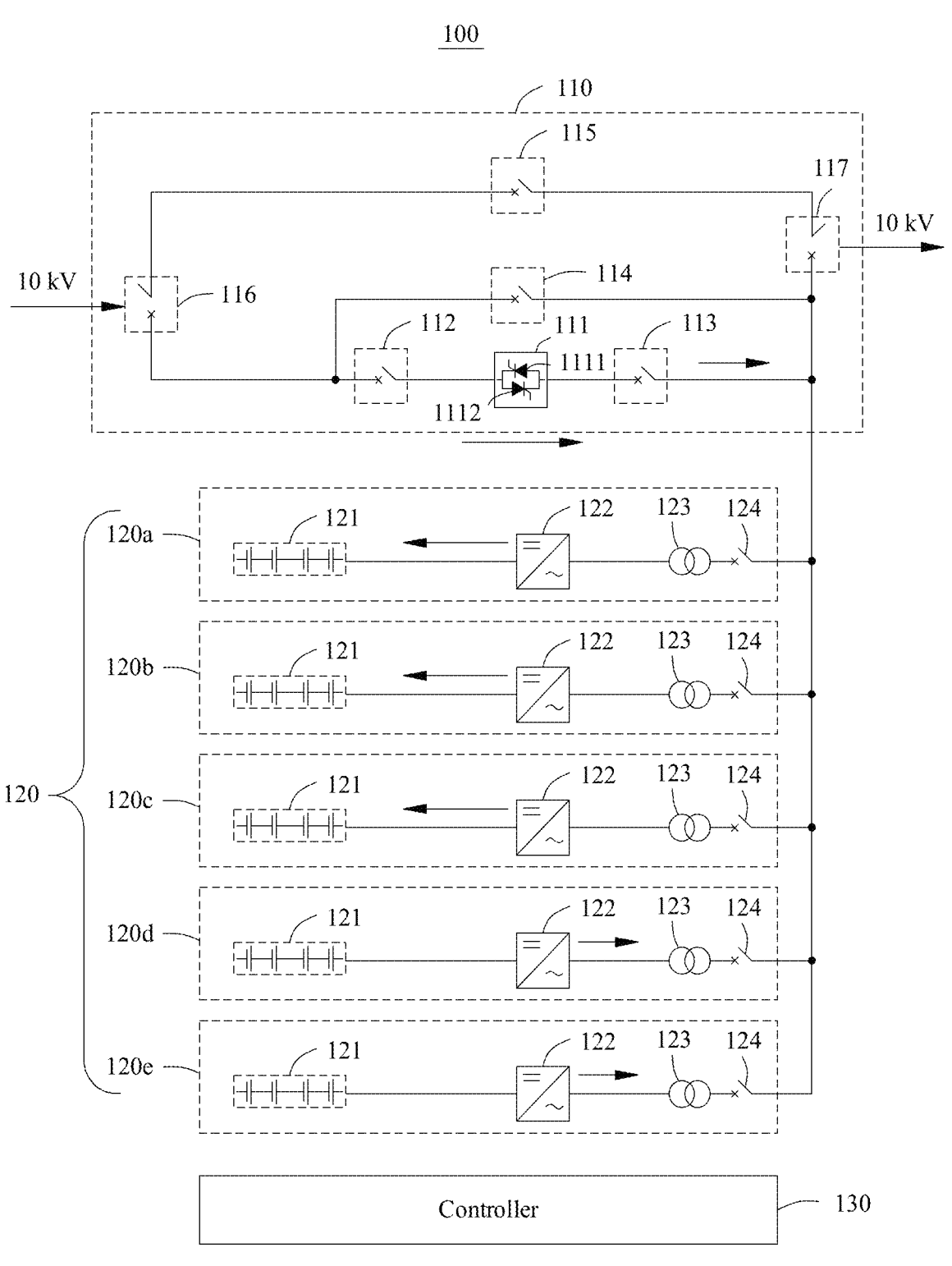
FIG. 2 is a schematic diagram of a specific structure of the power supply system in FIG. 1.

FIG. 2 is a schematic diagram of a specific structure of the power supply system 100.

The power supply system 100 includes the bypass branch 110, five energy storage branches (120a, 120b, 120c, 120d, and 120e), and the controller 130. Each energy storage branch includes the energy storage unit 121, the bidirectional inverter unit 122, the transformer unit 123, and the power distribution unit 124.

For example, the controller 130 controls three energy storage branches (120a, 120b, and 120c) to operate in the charging mode, and controls remaining two energy storage branches (120d and 120e) to operate in the discharging mode. In response to the energy storage units 121 in the three energy storage branches (120a, 120b, and 120c) charged with the first preset power, the controller 130 controls one energy storage branch (one of 120a, 120b, and 120c) in the three energy storage branches (120a, 120b, and 120c) to operate in the discharging mode, and controls one energy storage branch (one of 120d and 120e) other than the three energy storage branches (120a, 120b, and 120c) to operate in the charging mode, until all the energy storage branches (120a, 120b, 120c, 120d, and 120e) are charged with the second preset power.

For example, initial power of the energy storage unit 121 is 20% of a battery capacity. The first preset power and the second preset power are charged power of the energy storage unit 121. The first preset power is 20% of the battery capacity in the energy storage unit 121, and the second preset power is 80% of the battery capacity in the energy storage unit 121. It may be understood that a state of charge (SOC) of the energy storage unit 121 is also referred to as a state of energy, and is a sum of the initial power and the charged power of the energy storage unit 121.

In response to the energy storage units 121 in the energy storage branches (120a, 120b, and 120c) operating in the charging mode all charged with the first preset power (20%), that is, SOCs of the energy storage units 121 in the energy storage branches (120a, 120b, and 120c) are all 40%, the controller 130 controls the energy storage branch 120a to switch from operating in the charging mode to operating in the discharging mode, and controls the energy storage branch 120d to switch from operating in the discharging mode to operating in the charging mode. That is, after the first operating mode switching, the energy storage branches operating in the charging mode include 120b, 120c, and 120d, and the energy storage branches operating in the discharging mode include 120e and 120a.

After a period of charging, in response to all energy storage branches (120b, 120c, and 120d) operating in the charging mode charged with the first preset power (20%), that is, the SOCs of the energy storage units 121 in the energy storage branches 120b and 120c are 60%, and an SOC of the energy storage unit 121 in the energy storage branch 120d is 40%, the controller 130 controls the energy storage branch 120b to switch from operating in the charging mode to operating in the discharging mode, and controls the energy storage branch 120e to switch from operating in the discharging mode to operating in the charging mode. That is, after the second operating mode switching, the energy storage branches operating in the charging mode include 120c, 120d, and 120e, and the energy storage branches operating in the discharging mode include 120a and 120b.

After another period of charging, in response to all energy storage branches (120c, 120d, and 120e) operating in the charging mode charged with the first preset power (20%), that is, the SOC of the energy storage unit 121 in the energy storage branch 120c is 80%, the SOC of the energy storage unit 121 in the energy storage branch 120d is 60%, and an SOC of the energy storage unit 121 in the energy storage branch 120e is 40%, the controller 130 controls the energy storage branch 120c to switch from operating in the charging mode to operating in the discharging mode, and controls the energy storage branch 120a to switch from operating in the discharging mode to operating in the charging mode. That is, after the third operating mode switching, the energy storage branches operating in the charging mode include 120d, 120e, and 120a, and the energy storage branches operating in the discharging mode include 120b and 120c.

After another period of charging, in response to all energy storage branches (120d, 120e, and 120a) operating in the charging mode charged with the first preset power (20%), that is, the SOC of the energy storage unit 121 in the energy storage branch 120d is 80%, the SOC of the energy storage unit 121 in the energy storage branch 120e is 60%, and an SOC of the energy storage unit 121 in the energy storage branch 120a is 60%, the controller 130 controls the energy storage branch 120d to switch from operating in the charging mode to the discharging mode, and controls the energy storage branch 120b to switch from operating in the discharging mode to operating in the charging mode. That is, after the fourth operating mode switching, the energy storage branches operating in the charging mode include 120e, 120a, and 120b, and the energy storage branches operating in the discharging mode include 120c and 120d.

After another period of charging, in response to all energy storage branches (120e, 120a, and 120b) operating in the charging mode charged with the first preset power (20%), that is, the SOC of the energy storage unit 121 in the energy storage branch 120e is 80%, the SOC of the energy storage unit 121 in the energy storage branch 120a is 80%, and the SOC of the energy storage unit 121 in the energy storage branch 120b is 80%, the controller 130 controls the energy storage branch 120e to switch from operating in the charging mode to operating in the discharging mode, and controls the energy storage branch 120c to switch from operating in the discharging mode to operating in the charging mode. That is, after the fifth operating mode switching, the energy storage branches operating in the charging mode include 120a, 120b, and 120c, and the energy storage branches operating in the discharging mode include 120d and 120e.

After another period of charging, in response to all energy storage branches (120a, 120b, and 120c) operating in the charging mode charged with the first preset power (20%), that is, the SOC of the energy storage unit 121 in the energy storage branch 120a is 100%, the SOC of the energy storage unit 121 in the energy storage branch 120b is 100%, and the SOC of the energy storage unit 121 in the energy storage branch 120c is 100%, the controller 130 controls the energy storage branch 120a to switch from operating in the charging mode to operating in the discharging mode, and controls the energy storage branch 120d to switch from operating in the discharging mode to operating in the charging mode. That is, after the sixth operating mode switching, the energy storage branches operating in the charging mode include 120b, 120c, and 120d, and the energy storage branches operating in the discharging mode include 120e and 120a.

After another period of charging, in response to the energy storage branch 120d that operates in the charging mode and is not fully charged being charged with the first preset power (20%), that is, the SOCs of the energy storage units 121 in the energy storage branches (120b, 120c, and 120d) are all 100%, the controller 130 controls the energy storage branch 120b to switch from operating in the charging mode to operating in the discharging mode, and controls the energy storage branch 120e to switch from operating in the discharging mode to operating in the charging mode. That is, after the seventh operating mode switching, the energy storage branches operating in the charging mode include 120c, 120d, and 120e, and the energy storage branches operating in the discharging mode include 120a and 120b.

After another period of charging, the energy storage branch 120e that operates in the charging mode and is not fully charged is charged with the first preset power (20%), that is, the SOC of the energy storage unit 121 in the energy storage branch 120e is 100%. In this case, the SOCs of the energy storage units 121 in all the energy storage branches (120a, 120b, 120c, 120d, and 120e) are all 100%, that is, all the energy storage units 121 are fully charged.

In a possible implementation, when all the energy storage units 121 are fully charged, an operating status of the energy storage branch is not switched.

It may be understood that because switching time occurs when the energy storage branch switches between the discharging mode and the charging mode, if the bypass branch 110 is faulty when the energy storage unit 121 operating in the discharging mode is not charged to sufficient power, the energy storage unit 121 operating in the discharging mode can only supply power to the load 300 for a short time, or even cannot supply power to the load 300, for example, when the initial power of the energy storage unit 121 is 0. In this way, when the energy storage branch operating in the charging mode is not switched to the discharging mode, the load 300 has a power failure. In embodiments of this disclosure, the energy storage units 121 are charged in a polling manner, so that the energy storage units 121 in the plurality of energy storage branches can be charged in a time division manner. This helps avoid a case in which the load 300 has a power failure when the bypass branch 110 is faulty because the energy storage unit 121 operating in the discharging mode has insufficient power.

It may be understood that an arrow direction in each energy storage branch 120 in FIG. 2 is an electric energy transmission direction, that is, electric energy in the energy storage branches 120a, 120b, and 120c is transmitted from the bypass branch 110 to the energy storage units 121, and electric energy in the energy storage branches 120d and 120e is transmitted from the energy storage units 121 to the load 300.

Figure 3:
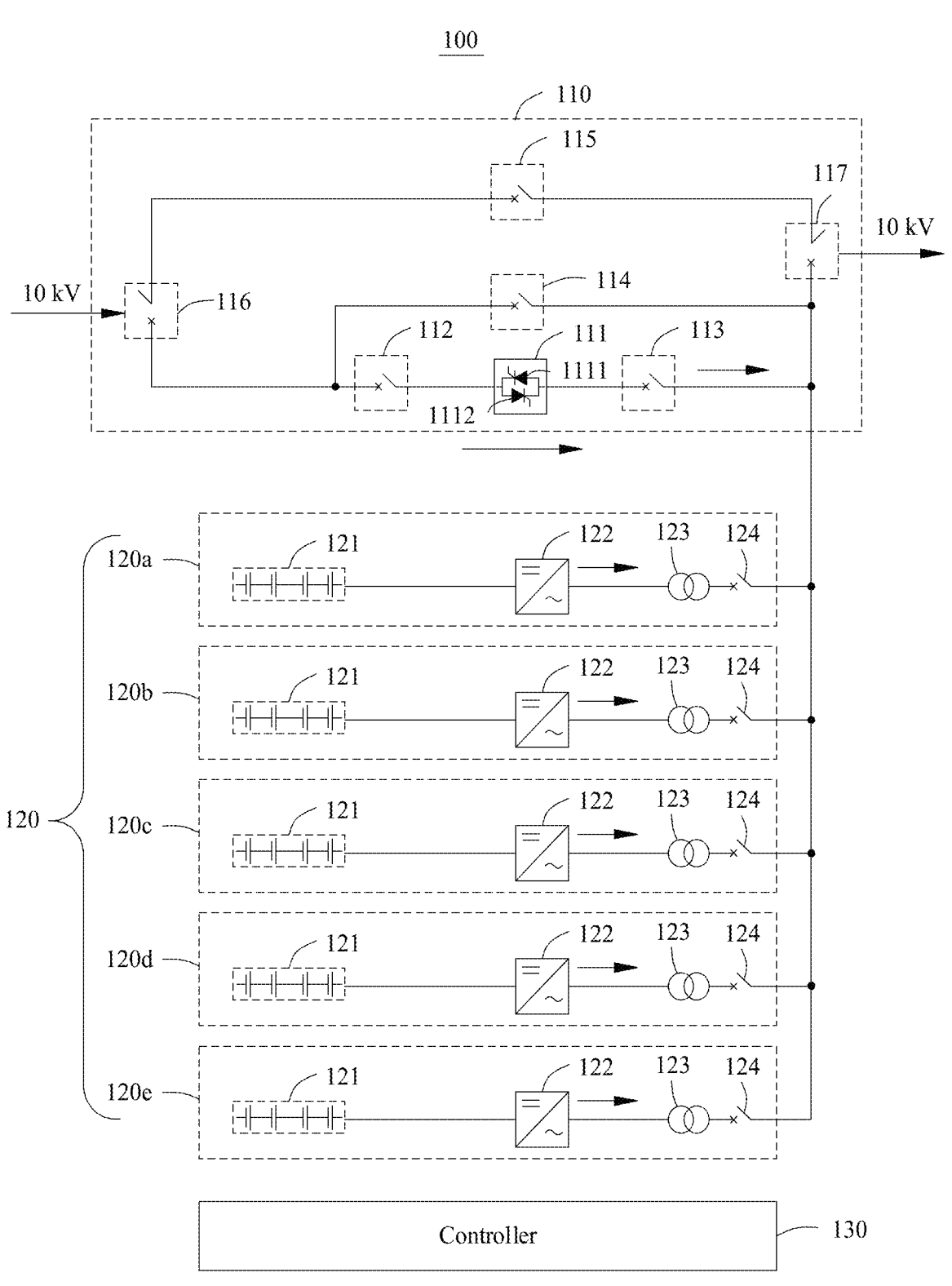
FIG. 3 is another schematic diagram of a specific structure of the power supply system in FIG. 1.

FIG. 3 is another schematic diagram of a specific structure of the power supply system 100.

As shown in FIG. 3, in response to that the output voltage of the bypass branch 110 is lower than the preset voltage value, the controller 130 controls the energy storage branch (for example, 120a, 120b, and 120c) in the charging mode to operate in the discharging mode. In this way, after a period of switching, all the energy storage branches (120a, 120b, 120c, 120d, and 120e) operate in the discharging mode, to supply power to the load 300. An arrow direction in each energy storage branch in FIG. 3 is an electric energy transmission direction, that is, the electric energy is transmitted from the energy storage unit 121 to the load 300.

In some other embodiments, the controller 130 is configured to, in response to the energy storage unit 121 in the energy storage branch 120 operating in the charging mode being fully charged, control the energy storage branch 120 in which the fully charged energy storage unit 121 is located to switch from the charging mode to the discharging mode, and control the energy storage branch 120 that is not fully charged and operates in the discharging mode to switch to the charging mode.

Still refer to FIG. 2. For example, the controller 130 controls three energy storage branches (120a, 120b, and 120c) to operate in the charging mode, and controls remaining two energy storage branches (120d and 120e) to operate in the discharging mode.

The controller 130 is configured to, in response to the energy storage branches 120a, 120b, and 120c all being fully charged, that is, the SOCs are 100%, control the energy storage branches 120a, 120b, and 120c to switch from operating in the charging mode to operating in the discharging mode, and control the energy storage branches 120d and 120e to switch from operating in the discharging mode to operating in the charging mode.

It may be understood that in these embodiments, the energy storage branches 120 are divided into two parts. The controller 130 first controls the first part of the energy storage branches 120 to operate in the charging mode to charge the energy storage units 121 corresponding to the first part of the energy storage branches 120. After the energy storage units 121 in the first part of the energy storage branches 120 are fully charged, the controller 130 controls the second part of the energy storage branches 120 to operate in the charging mode, to charge the energy storage units 121 in the second part of the energy storage branches 120, so that all the energy storage units 121 are fully charged.

In some embodiments, the bypass branch 110 includes the bypass switch 111, and the bypass switch 111 includes a first switching device 1111 and a second switching device 1112. The first switching device 1111 and the second switching device 1112 are reversely connected in parallel.

In this embodiment, the first switching device 1111 and the second switching device 1112 are silicon controlled rectifiers (SCR). The first switching device 1111 and the second switching device 1112 form a bidirectional SCR. The first switching device 1111 and the second switching device 1112 each have a control end. The controller 130 is separately connected to the control end of the first switching device 1111 and the control end of the second switching device 1112. The controller 130 is configured to separately output a first drive signal and a second drive signal to the control end of the first switching device 1111 and the control end of the second switching device 1112, to drive the first switching device 1111 and the second switching device 1112 to be turned on or off, to control the bypass branch 110 to be connected or disconnected.

For example, when the first drive signal is at a high level, the first switching device 1111 may be driven to be turned on. When the second drive signal is at a high level, the second switching device 1112 may be driven to be turned on. An input signal of the bypass branch 110 is an alternating current signal, and the alternating current signal has a part located in a positive half cycle and a part located in a negative half cycle, so that the bypass branch 110 can transmit currents in two directions. Therefore, the first drive signal and the second drive signal are given, and the first switching device 1111 and the second switching device 1112 that are reversely connected in parallel can be turned on when the input signal of the bypass branch 110 is located in the positive half cycle and the negative half cycle.

In some embodiments, the bypass branch 110 includes an input cabinet 112, an output cabinet 113, and a bypass maintenance cabinet 114. A first end of the input cabinet 112 is configured to connect to the power supply 200, and a second end of the input cabinet 112 is configured to connect to the bypass switch 111. A first end of the output cabinet 113 is configured to connect to the bypass switch 111, and a second end of the output cabinet 113 is configured to connect to the load 300. One end of the bypass maintenance cabinet 114 is configured to connect to the first end of the input cabinet 112, and a second end of the bypass maintenance cabinet 114 is configured to connect to the second end of the output cabinet 113.

When both the bypass branch 110 and the energy storage branch 120 operate normally, the input cabinet 112 and the output cabinet 113 may be closed, and the bypass maintenance cabinet 114 may be open. In this way, the power supply 200 can supply power to the load 300 or charge the energy storage unit 121 in the energy storage branch 120 through the branch in which the input cabinet 112, the bypass switch 111, and the output cabinet 113 are located.

When the energy storage branch is faulty (for example, when the bidirectional inverter unit 122 is faulty) or a component is replaced (for example, a battery in the energy storage unit 121 is replaced), the input cabinet 112 and the output cabinet 113 may be open, and the bypass maintenance cabinet 114 may be closed. In this way, the power supply 200 can charge the energy storage unit 121 in the energy storage branch 120 through the branch in which the bypass maintenance cabinet 114 is located.

In some embodiments, the bypass branch 110 further includes a central cabinet 115, a first transfer switch 116, and a second transfer switch 117. A first end of the first transfer switch 116 is configured to connect to the power supply 200, a second end of the first transfer switch 116 is configured to connect to the first end of the input cabinet 112, and a third end of the first transfer switch 116 is configured to connect to a first end of the central cabinet 115. A second end of the central cabinet 115 is configured to connect to a first end of the second transfer switch 117. A second end of the second transfer switch 117 is configured to connect to the second end of the output cabinet 113 and the second end of the bypass maintenance cabinet 114, and a third end of the second transfer switch 117 is configured to connect to the load 300.

For example, the first end of the first transfer switch 116 can be connected to the second end or the third end of the first transfer switch 116, to implement selection of a branch for electric energy transmission. When electric energy is transmitted through a branch in which the bypass switch 111 is located or a branch in which the bypass maintenance cabinet 114 is located, the first end of the first transfer switch 116 is connected to the second end of the first transfer switch 116; and when electric energy is transmitted through a branch in which the central cabinet 115 is located, the first end of the first transfer switch 116 is connected to the third end of the first transfer switch 116. The third end of the second transfer switch 117 can be connected to the first end of the second transfer switch 117 or the second end of the second transfer switch 117, to implement selection of a branch for electric energy transmission. When electric energy is transmitted through the branch in which the bypass switch 111 is located or the branch in which the bypass maintenance cabinet 114 is located, the third end of the second transfer switch 117 is connected to the second end of the second transfer switch 117. When electric energy is transmitted through the branch in which the central cabinet 115 is located, the third end of the second transfer switch 117 is connected to the first end of the second transfer switch 117.

An embodiment of this disclosure further provides a controller. The controller stores a computer program. When the computer program is executed, a control method of the power supply system 100 in the foregoing embodiment is implemented.

Figure 4:
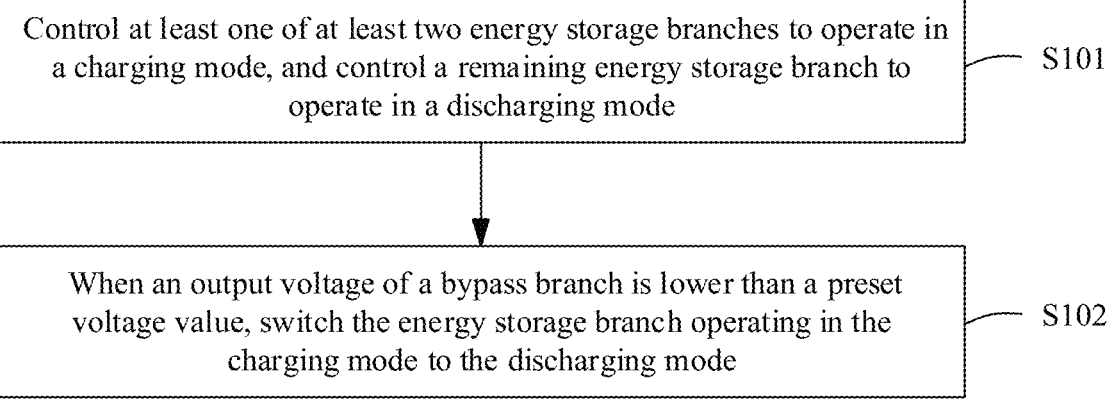
FIG. 4 is a schematic flowchart of a control method of a power supply system according to an embodiment of this disclosure.

Refer to FIG. 4. An embodiment of this disclosure further provides a control method of a power supply system. The control method is applied to the power supply system 100 in the foregoing embodiment. The control method includes the following steps.

Step S101: Control at least one of at least two energy storage branches to operate in a charging mode, and control a remaining energy storage branch to operate in a discharging mode.

In the charging mode, the energy storage unit 121 in the energy storage branch 120 can store electric energy. In the discharging mode, the energy storage branch 120 can supply power to the load 300 when an output voltage of the bypass branch 110 is lower than a preset voltage value.

It may be understood that this step is performed by the controller 130. For specific descriptions, refer to FIG. 1 to FIG. 3 and related descriptions thereof, and details are not described herein again.

Step S102: When the output voltage of the bypass branch 110 is lower than the preset voltage value, switch the energy storage branch 120 operating in the charging mode to the discharging mode.

It may be understood that this step is performed by the controller 130. For specific descriptions, refer to FIG. 1 to FIG. 3 and related descriptions thereof, and details are not described herein again.

It may be understood that in this embodiment of this disclosure, one part of energy storage branches 120 operate in the charging mode, and the other part of energy storage branches 120 operate in the discharging mode. When electric energy is interrupted or faulty, the energy storage branch 120 operating in the discharging mode can quickly supply power to the load 300. This helps reduce a risk of a power failure of the load 300.

A person of ordinary skill in the art should understand that the foregoing implementations are merely intended to describe this disclosure but are not intended to limit this disclosure. Appropriate modifications and variations made to the foregoing embodiments shall fall within the protection scope of this disclosure as long as they fall within the substantive scope of this disclosure.

What is claimed is:

1. A power supply system comprising:
a bypass branch comprising:
    a bypass branch input configured to connect to a power supply; and
    a bypass branch output configured to supply first power to a load;
energy storage branches, wherein each of the energy storage branches comprises:
    an energy storage branch output configured to connect the load to the bypass branch output;
    an energy storage; and
    a bidirectional inverter configured to:
        convert an alternating current from the bypass branch into a direct current;
        output the direct current to the energy storage when a respective energy storage branch of the energy storage branches operates in a charging mode; and
        convert a direct current from the energy storage into an alternating current when the respective energy storage branch operates in a discharging mode; and
a controller configured to:
    control a first energy storage branch of the energy storage branches to switch from the discharging mode to the charging mode when a first energy storage of the first energy storage branch is not fully charged; and
    control a second energy storage branch of the energy storage branches to switch from the charging mode to the discharging mode when a second energy storage of the second energy storage branch is fully charged,
wherein the bidirectional inverter is further configured to supply second power to the load when the respective energy storage branch operates in the discharging mode and a first output voltage of the bypass branch is less than a preset voltage value.

2. The power supply system of claim 1, wherein the controller is further configured to switch, in response to the first output voltage being less than the preset voltage value, a third energy storage branch of the energy storage branches operating in the charging mode to the discharging mode.

3. The power supply system of claim 2, wherein in response to the first output voltage being less than the preset voltage value, the respective energy storage branch is configured to run in overload for a preset time when operating in the discharging mode, and wherein the preset time is greater than a switching time for the respective energy storage branch to switch from the charging mode to the discharging mode.

4. The power supply system of claim 1, further comprising:
a transformer comprising:
    a first end configured to connect to the load; and
    a second end configured to connect to one or more bidirectional inverters in the energy storage branches,
wherein the transformer is configured to:
    boost a second output voltage from the bidirectional inverter and output the second output voltage to the load.

5. The power supply system of claim 4, wherein each of the energy storage branches comprises a respective transformer, wherein the second end is of the respective transformer and is further configured to connect to the bidirectional inverter in the energy storage branch in which the respective transformer is located.

6. The power supply system of claim 1, wherein the controller is further configured to:
control m energy storage branches in the energy storage branches to operate in the charging mode;
control an energy storage branch other than the m energy storage branches to operate in the discharging mode; and
in response to the energy storages in the m energy storage branches all charged with first preset power:
    control p energy storage branches in the m energy storage branches to operate in the discharging mode; and
    control p energy storage branches other than the m energy storage branches to operate in the charging mode, until energy storages in all the energy storage branches are all charged with second preset power, wherein
    m is an integer greater than 2, p is an integer greater than or equal to 1, and m is greater than p.

7. The power supply system of claim 1, wherein the respective energy storage branch is configured to provide a compensation current in the charging mode, and wherein the compensation current is configured to compensate for a harmonic current in a load current of the bypass branch.

8. The power supply system of claim 1, wherein the bypass branch comprises a bypass switch comprising:
a first switching device; and
a second switching device reversely connected in parallel to the first switching device, wherein the controller is further configured to output a first drive signal and a second drive signal, wherein the first drive signal is configured to drive the first switching device to turn on or off, and wherein the second drive signal is configured to drive the second switching device to turn on or off.

9. The power supply system of claim 8, wherein the bypass branch comprises:

an input cabinet comprising:

a first end configured to connect to the power supply; and a second end configured to connect to the bypass switch; and an output cabinet comprising:

a third end configured to connect to the bypass switch; and a fourth end configured to connect to the load.

10. The power supply system of claim 2, wherein the power supply system further comprises:

at least one transformer comprising:

a first end configured to connect to the load; and a second end configured to connect to one or more bidirectional inverters in the energy storage branches, wherein each transformer is configured to: decrease the first output voltage and output the first output voltage to the bidirectional inverter.

11. The power supply system of claim 1, wherein the controller is further configured to charge a third energy storage branch of the energy storage branches in a time division manner in the charging mode.

12. The power supply system of claim 9, wherein the bypass branch further comprises a bypass maintenance cabinet, and wherein the bypass maintenance cabinet comprises:

a fifth end configured to connect to the first end; and a sixth end configured to connect to the fourth end.

13. The power supply system of claim 4, further comprising a power distributor, comprising:

a third end configured to connect to the load; and a fourth end configured to connect to the transformer, wherein the power distributor is configured to output the alternating current to the transformer or the load.

14. The power supply system of claim 8, wherein the first switching device and the second switching device are silicon-controlled rectifiers.

15. A method, comprising:

operating a first energy storage branch of a power supply system in a charging mode;

operating a second energy storage branch of the power supply system in a discharging mode;

converting an alternating current from a bypass branch into a direct current;

outputting the direct current to a first energy storage in the first energy storage branch while the first energy storage branch is in the charging mode;

converting a direct current from a second energy storage in the second energy storage branch into an alternating current while the second energy storage branch is in the discharging mode;

supplying power to a load when an output voltage of the bypass branch is less than a preset voltage value;

switching the first energy storage branch to the discharging mode when the first energy storage is not fully charged; and switching the second energy storage branch to the charging mode when the second energy storage branch is fully charged.

16. The method of claim 15, further comprising outputting a compensation current from the first energy storage branch, wherein the compensation current is configured to compensate for a harmonic current in a load current of the bypass branch.

17. The method of claim 15, further comprising charging the first energy storage branch and a third energy storage branch in a time division manner.

18. A power supply system comprising:

a bypass branch comprising:

a bypass branch input configured to connect to a power supply; and a bypass branch output configured to supply power to a load; and energy storage branches, wherein each of the energy storage branches comprise:

an energy storage branch output configured to connect the load to the bypass branch output;

an energy storage;

a bidirectional inverter configured to:

convert an alternating current from the bypass branch into a direct current and output the direct current to the energy storage when a respective energy storage branch of the energy storage branches operates in a charging mode; and convert a direct current from the energy storage into an alternating current when the respective energy storage branch operates in a discharging mode;

a transformer comprising:

a first end configured to connect to the load; and a second end configured to connect to one or more bidirectional inverters in the energy storage branches; and a controller configured to:

control m energy storage branches in the energy storage branches to operate in the charging mode;

control an energy storage branch other than the m energy storage branches to operate in the discharging mode; and in response to the energy storages in the m energy storage branches all charged with first preset power:

control p energy storage branches in the m energy storage branches to operate in the discharging mode; and control p energy storage branches other than the m energy storage branches to operate in the charging mode, until energy storages in all the energy storage branches are all charged with second preset power, wherein m is an integer greater than 2, p is an integer greater than or equal to 1, and m is greater than p.

19. The power supply system of claim 18, wherein the controller is further configured to charge at least one of the energy storage branches in a time division manner in the charging mode.

20. The power supply system of claim 18, wherein the respective energy storage branch is configured to provide a compensation current in the charging mode, and wherein the compensation current is configured to compensate for a harmonic current in a load current of the bypass branch.

* * * * *